United States Patent [19]

Bergquist

[11] Patent Number: 4,785,666

[45] Date of Patent: Nov. 22, 1988

[54] METHOD OF INCREASING THE SENSITIVITY OF A LEAK DETECTOR IN THE PROBE MODE

[75] Inventor: Lyle E. Bergquist, Littleton, Colo.

[73] Assignee: Martin Marietta Corporation, Bethesda, Md.

[21] Appl. No.: 944,321

[22] Filed: Dec. 19, 1986

[51] Int. Cl.[4] ............................................. G01M 3/20
[52] U.S. Cl. ...................................... 73/40.7; 62/55.5
[58] Field of Search .......................... 73/40.7; 62/55.5; 250/288

[56] References Cited

U.S. PATENT DOCUMENTS

| | | | |
|---|---|---|---|
| 3,091,114 | 5/1963 | Webster | 73/40.7 |
| 3,246,505 | 4/1966 | Koehmstedt et al. | 73/40.7 |
| 3,416,359 | 12/1968 | Durbin et al. | 73/40.7 |
| 3,504,528 | 4/1970 | Weinberg et al. | 73/49.3 |
| 3,578,758 | 5/1971 | Altshuler | 73/40.7 |
| 3,645,127 | 2/1972 | Mongodin et al. | 73/40.7 |
| 3,646,804 | 7/1972 | Myers | 73/49.3 |
| 3,672,207 | 6/1972 | Cramp et al. | 73/40.7 |
| 3,690,151 | 9/1972 | Briggs | 73/40.7 |
| 3,738,158 | 6/1973 | Farrell et al. | 73/40.7 |
| 3,762,212 | 10/1973 | Morley et al. | 73/40.7 |
| 3,824,839 | 7/1974 | Briggs | 73/40.7 |
| 3,888,111 | 6/1975 | Craig | 73/40.7 |
| 3,968,675 | 7/1976 | Briggs | 73/40.7 |
| 4,154,092 | 5/1979 | White et al. | 73/49.3 |
| 4,158,960 | 6/1979 | White et al. | 73/40.7 |
| 4,294,106 | 10/1981 | Gevaud et al. | 73/40.7 |
| 4,356,721 | 11/1982 | White et al. | 73/40.7 |
| 4,419,882 | 12/1983 | Ishii et al. | 73/40.7 |
| 4,436,998 | 3/1984 | Tallon | 250/288 |
| 4,446,702 | 5/1984 | Peterson et al. | 62/55.5 |
| 4,459,844 | 7/1984 | Burkhart | 73/40.7 |
| 4,492,110 | 1/1985 | Bergquist | 73/40.7 |
| 4,577,465 | 3/1986 | Olsen et al. | 62/55.5 |
| 4,583,394 | 4/1986 | Murakami et al. | 73/40.7 |
| 4,593,530 | 6/1986 | Longsworth | 62/55.5 |
| 4,608,866 | 9/1986 | Bergquist | 73/40.7 |
| 4,614,093 | 9/1986 | Bachler et al. | 62/55.5 |

FOREIGN PATENT DOCUMENTS 60-66127(A)  4/1985  Japan .
2123153  1/1984  United Kingdom .

Primary Examiner—Stewart J. Levy
Assistant Examiner—Hezron E. Williams
Attorney, Agent, or Firm—Tarolli, Sundheim & Covell

[57] ABSTRACT

An apparatus and process designed for detecting both large and small leaks in components, such as the hermetic seals of electronic components, especially small components. The small component leak detector comprises (i) a container means such as a glove box maintained at about one atmosphere pressure for receiving test objects, (ii) a movable probe situated with the glove box for sniffing and capturing samples of detecting gas in proximity to the test object, (iii) an entrainment pump which consists of a getter pump or a modified cryopump located between the sampling probe and the mass detector for measuring the detecting gas, and (iv) a mass detector. The entrainment pump is capable of entrapping a purge carrier gas, such as nitrogen, but not entrapping a detecting gas, such as helium.

23 Claims, 2 Drawing Sheets

METHOD OF INCREASING THE SENSITIVITY OF A LEAK DETECTOR IN THE PROBE MODE

Field of the Invention

The present invention relates to an improved noble gas leak detector and a process for detecting leaks in test objects, especially for small components, such as electronic circuit components.

BACKGROUND OF INVENTION

The reliability of small electronic components depends to a great extent upon how well the component is hermetically sealed from reactive gases and water vapor. The test for determining the adequacy of the hermetic seal is important.

Presently, there are several methods for determining the leak rate in small electronic components. Several methods require that the electronic component be exposed to or "bombed" with a gas. Typically, the gas is helium or sometimes argon or krypton. After exposing the electronic component for a specified time and pressure to the gas, the component is removed and tested for leaks. Breaks or defects in the hermetic seal are revealed by the gas which has infiltrated the component and which is detected as a "leak" when the gas flows out of a break or defect in the hermetic seal. The tests are designed either for gross or large leaks or for fine or small leaks.

Other gross leak test methods have also been used. One such method involves exposing a small electronic component to a gas and measuring the weight gain. Another involves exposing the component to a hydrocarbon gas and measuring the hydrocarbon vapor released while pressurizing the component with another gas.

Finally, leak tests on electronic components have employed mass spectrometers. One such device is illustrated in Altshuler U.S. Pat. No. 3,578,578. Although helium leak detectors have been used for fine leak testing small electroninc components, one disadvantage is that present helium leak detectors are not totally suited for detecting large leaks in small component test objects. If a component having a large leak is subjected to a helium leak detector, all the helium may be exhausted out of the component by the vacuum system before detection measurement. In any event, such a helium leak detector reduces the apparent size of a large leak. In general, present helium leak detectors for small electronic components have inadequate sensitivity range.

Getter pumps which have been employed in ultra sensitive leak detectors (e.g., Bergquist U.S. Pat. No. 4,492,110) have not been employed in leak detectors for small components since getters are unable to quickly handle the relatively large volume of purge carrier gas which must be employed in helium leak detecting small components. U.S. Pat. No. 4,492,110 uses a nonevaporable getter pump connected to the vacuum chamber.

Cryogenic pumps have been previously employed in vacuums. One deficiency of a typical cryogenic creating pump is that it is unable to handle a relatively large volume of purge carrier gas used in leak detecting smal components. Adsorption of a large volume of gas warms up the cryogenic pump which results in desorption of the purge carrier gas. That in turn raises the pressure to an unacceptable level for the mass spectrometer. Secondly, cryogenic pumps adsorb helium and may later desorb helium which destroys the efficacy of the detection of helium by the mass spectrometer. U.S. Pat. No. 4,593,530 to Longsworth, teaches cold surfaces that freeze water and nitrogen and additionally freezes helium using charcoal as cold adsorbent.

In recently issued U.S. Pat. No. 4,608,866, Bergquist describes a leak detector where a modified cryogenic pump is connected to a vacuum chamber in such position to allow the cryogenic pump to entrap a purge carrier gas, such as nitrogen, but not entrap the detecting gas, such as helium, which is passed to a mass detector.

All of the known leak detector systems discussed above are closed systems, i.e., the test specimen or its container is subjected to a vacuum. The disadvantages of the prior systems, i.e., sensitivity and ability to detect both large and small leaks, have now been overcome by the instant open system leak detector system. While the sensitivity of the U.S. Pat. No. 4,608,866 patent is good, the present invention using an "open system" allows the rapid checking of individual small components and the rapid identification of the defective leak areas without the limitation of placing the test object under high vacuum.

SUMMARY OF THE INVENTION

The present invention is directed to an "open system" apparatus and process for detecting gas leakage from a test object.

A helium leak detector is provided for detecting leaks in a test component. The test component is positioned in a container for example, a glove box chamber having a movable probe therein for conducting a flow of gas from locations adjacent to the test object to the gas separator (entrainment pump).

The size of the container may vary widely, depending on the size and quantity of the items to be tested. An entrainment pump is in gaseous communication with the glove box through interconnecting passages and a movable probe having a sniffer valve. Vapor flow between the test chamber and the entrainment pump is controlled by the sniffer valve. The entrainment pump which is in direct gaseous communication with the leak detector through an optional valve must be a nonevaporable getter pump, a modified cryogenic pump as hereinafter described or a combination thereof. A mechanical pump in series with a diffusion or turbomolecular pump exhausts the measured helium to the atmosphere after it is detected in the mass detector. The pressure of gas at the helium detector is measured by a vacuum gauge and must be less than $1 \times 10_{-4}$ Torr.

A second aspect of the invention is a process for detecting leaks using the above described apparatus where purified nitrogen is the second gas, sometimes referred to as carrier gas, and the first gas (sometimes referred to as detector gas) is helium or argon and preferably helium; test specimen is sniffed with a movable probe in an open system, such as a nitrogen "glove box", using high purity nitrogen at approximately 1 atmosphere and the gas captured in the vicinity of the test specimen is conducted via the probe to the separator means sometimes referred to as an entrainment pump. The entrainment pump can be a nonevaporable getter pump or a modified cryogenic pump which selectively removes the nitrogen carrier gas and passes the helium detector gas to mass spectrometer.

A further aspect of the invention is an apparatus as described above wherein the container is a movable mechanism that can be placed over and envelope the test object passing on a production conveyor mechanism and can be rapidly moved sequentially from one test object to another. Another aspect relates to an improved cryopump, wherein the pressure in the cryopump is reduced by about factor of 1,000 by expansion, by a factor of 4 by internal cooling and by a factor of 6,000 by adsorption of nitrogen gas on the cooled surface of the cryopump.

DETAILED DESCRIPTION OF PREFERRED EMBODIMENT

Figure 2:
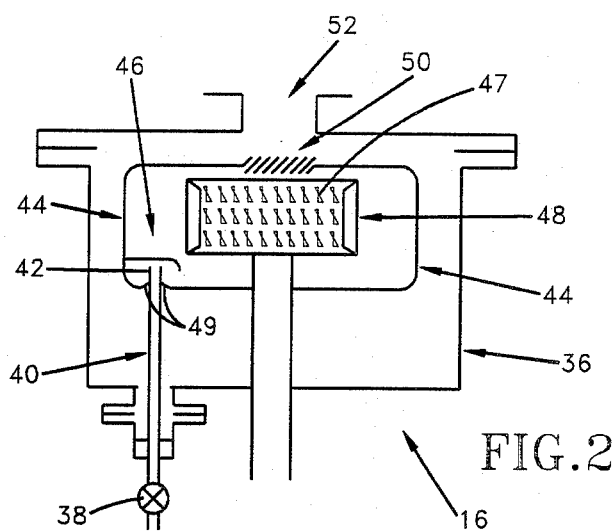
FIG. 2 depicts a cross-sectional view of an improved cryopump.

In the instant "open system" apparatus, detector gas in the vicinity of the test object in the glove box is conveyed via a needle valve probe to a gas separator means at a gas flow rate about 2 Torr L/sec. The separator means is often called an "entrainment pump" and is used to designate either a getter pump or a modified cryopump as defined herein. For the purposes of this invention, these terms are used interchangeably to mean an entrainment pump and specifically one directly located between the probe and the detecting gas detector. By using the entrainment pump between the probe and the detector, the amount of gas entering the probe is increased by at least a factor of 1000 with a similar increase in the collection efficacy of the noble gas. Since such system allows a greater amount of gas to be collected, a greater percentage of noble gas (helium) coming from the leak in the test specimen enters and is measured in the leak detector means at an operable pressure level. The entrainment pump is designed to remove the carrier gas, such as nitrogen, while allowing all of the detecting gas escaping from the test specimen to be measured in the mass detector 18. The entrainment pump which is situated between the probe and the detector mechanism represents any device that will remove active gas but not adsorb the detector gas, i.e., helium. Suitable "entrainment pumps" can be a nonevaporable getter pump or a cryogenic pump as disclosed in the Bergquist patents, U.S. Pat. Nos. 4,492,110 and 4,608,866, respectively, both of which are incorporated herein by reference. A preferred cryopump is shown in FIG. 2. The advantage of the present leak detector system resides in the fact that the gas separator, i.e., entrainment pump, can separate large quantities of purified nitrogen gas (up to 400 atmospheric liters) while passing all of the helium gas originating from a leak in the test object.

The instant invention differs from the art cited, especially U.S. Pat. Nos. 4,492,110 and 4,608,866 in that the test object is positioned in a container or "glove box" having a controlled atmosphere, preferably helium-free nitrogen at about 1 atmosphere. Heretofore, helium gas leak detector systems have used test objects in a closed system, i.e., in a vacuum chamber or under reduced pressure. Contrary to the prior art references, the present invention requires that the test object be located in a "glove box" under ambient conditions of temperature and pressure with a purified nitrogen blanket. Applicant believes that the present invention represents the first helium leak detector utilizing such an "open system" where the test object remains at about atmospheric pressure in the "glove box". Using the present "open system", the sensitivity is remarkably increased for several reasons. Since a large amount of carrier gas can be sorbed in the entrainment pump, a larger amount of helium gas can be detected in the typical mass spectrometer detector; the helium normally found in air is greatly reduced because of the nitrogen purge. Such a system allows the valve V1, in proximity with the probe, to be opened wider, while still maintaining a relatively low pressure in the leak detector.

Another aspect of the present invention is an improved cryopump shown schematically in FIG. 2 which is particularly useful as the entrainment pump in the present invention. The new cryopump has an outer jacket within the pump that is cooled to about 80K, and an inner section cooled to about 10K–22K and preferably maintained at 18° K −20° K. The cryopump is designed to insure that the gas entering the entrance valve 38 of the cryopump will impinge directly on the 80K surface and will lose at least about 50 percent of its heat before passing to the 10K–22K inner surface where the nitrogen freezes out. This result is effected by directing the incoming mixture of helium and nitrogen gases from the probe means through a tube (approximately ¼" in diameter) to cause the gases to impinge directly on the 80K surface until it equilibrates and removes at least about 50 percent of the heat before passing to the 10K–22K surface. The presence of a copper metal entrance baffle projecting inwardly from the 80K surface in the vicinity of the gas inlet helps to establish this equilibration by acting as a barrier to the free passage of gas to the inner cooling surface.

The term container means designates any container that houses the test object under a cover of protective gas, preferably nitrogen, that is helium free and maintained at or about 1 atmosphere pressure. In practice, the pressure within the container will vary slightly below or above 1 atmosphere, depending on the amount of protective gas and the degree of opening of sniffer valve V1 which can be independently regulated. In one mode, the container is a glove box that has ports to allow the manual or mechanical handling of the test object and the placement of the probe along the various perimeters of the test object. Other modes include high speed conveyor belt production testing.

The carrier gas (nitrogen) must be essentially free of helium, i.e., less than one part helium per trillion parts nitrogen. Such "helium free" nitrogen can be purchased commercially or can be generated from liquid nitrogen.

The movable probe is disposed in the container means. Probing of the test piece in the glove box is often referred to as "sniffing" with a "sniffer" probe. The test object is pressurized with helium gas and the probe mechanism can consist of a needle valve connected to a metal bellows tubing for flexibility and mobility. In such fashion, the probe is moved about the test object, which may be a single or multi-compartmented device.

As indicated above, the separator means can be a typical nonevaporable getter as disclosed in U.S. Pat. No. 4,492,110. Preferred metallic-type getters are those having multiple barriers for contact and removal of the carrier gas. Preferred getter surfaces are metallic powder surfaces or metallic powder including cerium-rubidium alloys, and alloys of tantalum, titanium, zirconium and rare earth elements such as hafnium. When the entrainment pump is a getter pump, it is preferred to use a multiple baffle with a powdered metal surface which is heated. The most preferred getter is one packed with such alloy powders. Suitable getters which are available commercially include SAES getters and the nonevaporable getters (Hy-Stor 504) available from Ergenics Company, Inc. One may elect to use a nonevaporable getter when argon is the detecting gas. When helium is the noble detector gas it is preferred to use a cryopump as modified herein since argon is entrapped in a cryopump at these operating temperatures.

Alternatively, the "entrainment pump" may consist of a modified cryopump as set forth in U.S. Pat. No. 4,608,866 to Bergquist.

The modified cryogenic pump employed in the present invention is generally kept at a temperature from about 10K to about 22K, preferably from about 18K to about 20K. As shown in U.S. Pat. No. 4,608,866, a conventional cryogenic pump is modified for purposes of the present invention by (i) the addition of a heater to keep the cryogenic pump at the above specified temperatures, (ii) the addition of lead to the cooling surfaces, and (iii) the removal of any material, such as charcoal, which would adsorb the detecting gas, helium. A conventional cryogenic pump is modified by adding a heater in order to keep the cryogenic pump at a temperature from about 10K to about 22K, preferably from about 18K to about 20K. A conventional cryogenic pump has charcoal designed to entrap helium. According to the present invention, the charcoal must be removed from the cryogenic pump so as not to entrap the detecting gas, helium. The conventional cryogenic pump is further modified in order to add lead to the cooling fins or jet. This adds thermal mass to those surfaces. Lead has a much greater specific heat than copper at low temperatures and thus serves to quickly adsorb the heat of the nitrogen purge carrier gas without heating the system or raising the pressure for the mass detector. The modified cryogenic pump of the present invention can easily absorb the volume of purge carrier gas, i.e., 2 standard cubic centimeter per second.

The 10K-22K surface must be maintained at temperature to ensure the entrapmment of the purge carrier gas (nitrogen). If only the charcoal (which adsorbs helium) is removed from an other wise conventional cryogenic pump and the cryogenic pump is operated at its typical operating temperature, below about 10K, helium can stick to the nitrogen ice in the cryogenic pump. Thus, the modifications, in accordance with the present invention, are designed to keep the cryogenic pump at a temperature from about 10K to about 22K, preferably from about 18K to about 20K. Above about 22K, the cryogenic pump starts to desorb nitrogen. When the cryogenic pump fills up with frozen nitrogen, about 400 atmospheric liters, the cryogenic pump can be regenerated in accordance with normal procedures.

The present invention is also directed to a process for detecting leaks in objects, such as small electronic components. The process of the present invention employs the foregoing apparatus and uses a purge carrier gas, such as nitrogen, to purge the container before introducing the electronic components. The purge carrier gas is necessary in order to eliminate the presence of any detecting gas, helium, in the system except for that which is carried by the test object. The modified cryogenic pump can be employed as the sole entrainment pump to evacuate and trap the purge carrier gas or alternatively can be used with other getter pumps. A mass detector, such as a mass spectrometer, is then employed to detect all of the helium leaked from the test object, thus indicating the presence of any leaks. If helium is detected, its origin and amount represent a signal corresponding to a leak in the test object.

The detector gas passes from the exit port of the entrainment pump and is analyzed in a mass detector 18 which is connected by interconnecting passages with the gas separator and movable probe. If desired, the gas passing to the mass detector can be regulated by an additional valve V2 located between the separator exit and the mass detector. The mass detector can be a magnetic sector spectrometer or quadruple mass spectrometer, the latter being preferred.

Figure 1:
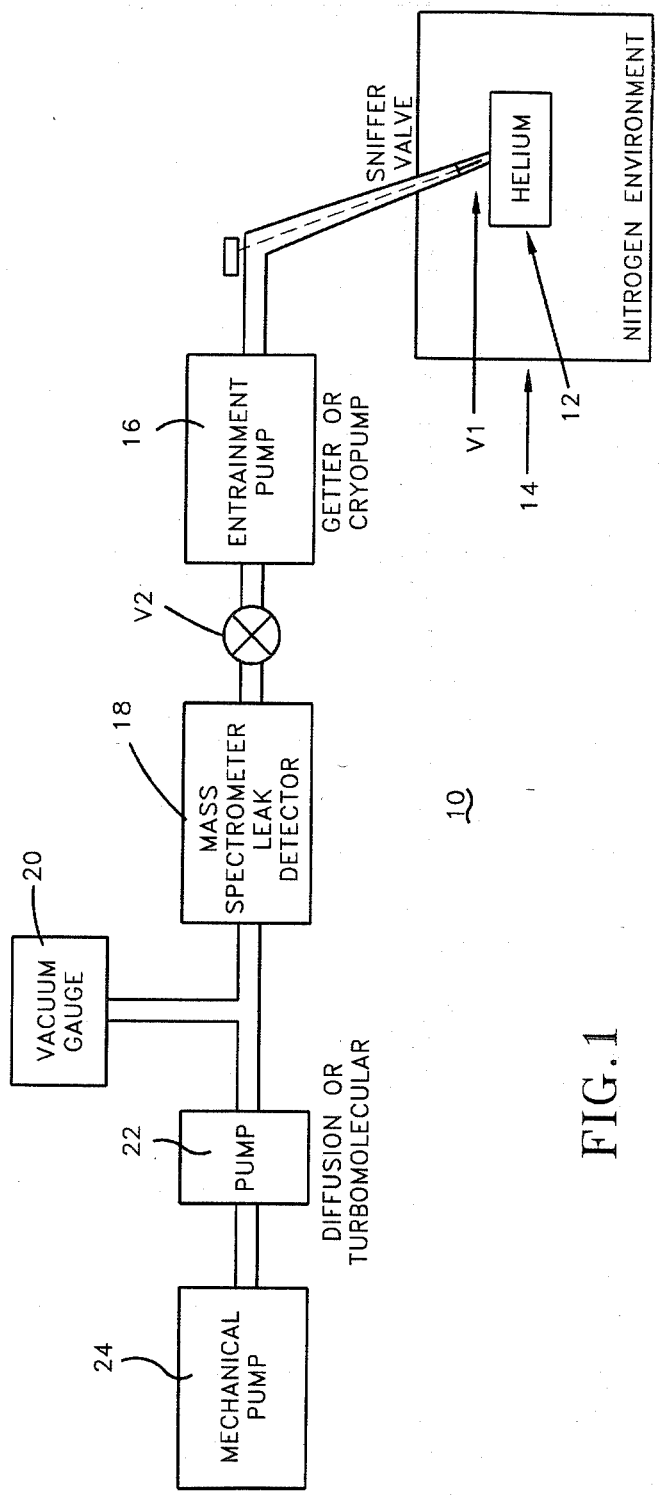
FIG. 1 schematically shows in block diagram form the small component helium leak detector of the present invention.

Operation of the apparatus depicted in FIG. 1 and the process of the present invention will now be described. A small component to be leak detected is exposed or bombed with the detecting gas, such as helium. Typically, the part is subjected to helium at a pressure from about 30 psi to about 60 psi to inject any helium into the component. The purpose is to detect any helium that gets into any breaks in the hermetic seal and leaks back out during the test.

A purge carrier gas, such as purified nitrogen, is introduced into the glove box 14 at a pressure equal to or only slightly above atmospheric pressure to replace the air. While introducing the purge gas, the test components 12 to be leak tested are inserted into the glove box 14. On opening the probe valve V2, gas and helium from the leak, if any, is evacuated into the entrainment pump through the sniffer valve V1. The entrainment pump 16 entraps the nitrogen but does not entrap the helium. All of the helium which may be leaking from the test component remains in a gaseous phase and passes to the mass detector.

In accordance with the present invention, the purge carrier gas can be nitrogen or other non-helium containing gas. Other helium-free gasses could be employed as the purge carrier gas so long as they will be entrapped by the cryogenic pump and will not entrap the detecting gas. A preferred method for obtaining the pure carrier gas is to permit liquid nitrogen to evaporate. Evaporated liquid nitrogen results in a gas having helium impurities less than about one part per trillion. Helium is the preferred detecting gas.

Nonmetallic components in the leak detector system 10 are to be avoided since nonmetallic components can adsorb and then desorb helium, thus contributing to undesirable background. Preferably, all connecting means between valves and passages or between passages and functional units are constructed of mating flanges made of metal and metal gaskets. Using all metal seals and metallic vacuum system for the leak detector reduces the helium background in the system and the possibility of helium permeating through O-rings. Another advantage of the instant leak detection system is that it can be operated with a single valve, namely V1, the sampling-sniffer valve. Using only one valve significantly reduces the cost of the entire system.

The "open" system is an improvement over prior leak detectors because it uses an entrainment separator located between the sampling probe, located within a "glove box," and the leak detector. The entrainment separator pump, either a getter or a modified cryopump, removes the nitrogen and allows the helium to flow to the leak detector, be detected and then exhausted to the atmosphere. This allows for a much larger amount of gas to flow into the sampling probe which increases the collection efficiency of helium as it emanates from the device under test.

Normal air has 5 ppm of helium. If one pumps into the system, air at 1 scc/sec, the helium background from air is equivalent to a leak of $5 \times 10^{-6}$ scc/sec. This invention requires nitrogen gas which is essentially free of helium, i.e., less than about one part per trillion. By purging the glove box with purified nitrogen, the helium background is reduced several decades. Thus, if helium is detected, it is coming from the device under test.

Another advantage of the present invention is that the apparatus and process have a large sensitivity dynamic range encompassing large leak rates from about 2 atm cc/sec to about $10^{-12}$ atm cc/sec.

By regulating the amount of carrier gas passing to the "entranment pump" through valve V1, the same leak detection system 10 can be used to detect both gross and fine leaks, thus simplifying available test apparatus needed for leak checking small electronic components. Small components travelling on a movable surface inside the nitrogen glove box can be leak checked by the sampling probe. In a preferred mode, the container means containing the probe totally envelopes the test object as it travels on a conveyor belt on a product assembly line. The container momentarily encloses the commponent to be tested and measures all the helium coming from the component. Components can be individually tested in this method very rapidly, i.e., rates as high as a second if the component is small like 0.01 to 0.1 cc. An additional benefit allows small components to be individually tested very rapidly as opposed to batch testing. Larger volume components can be checked in the glove box where the probe is moved around the object or test areas.

For economy purposes, valve V2 between the separator exit and the mass detector can be eliminated if desired. However, it is useful in protecting the getter or cryopump separator during periods of waiting or line shut down or for regeneration purposes.

Figure 3:
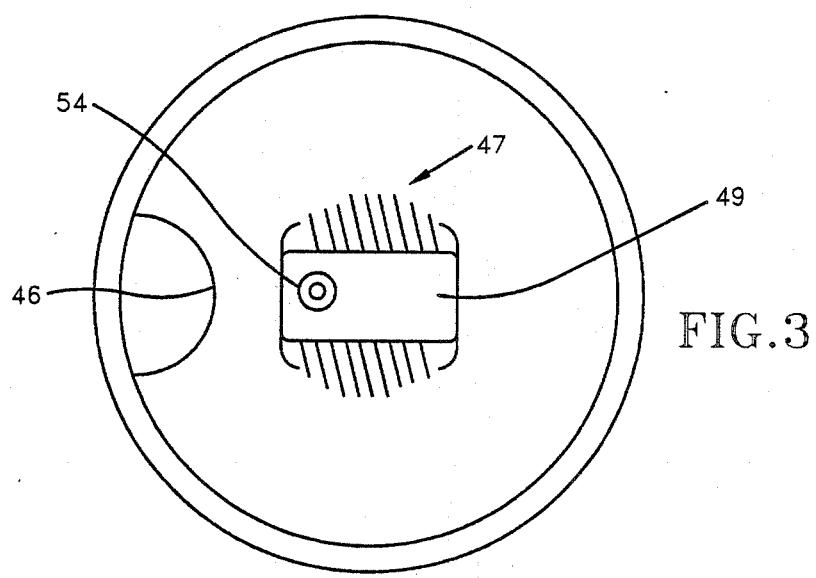
FIG. 3 is a top view of the improved cryopump.

An improved cryopump 16, contained within housing chamber 36 and useful for purposes of the present apparatus and process, is shown in FIGS. 2 and 3. The pump is similar to the cryopump described in U.S. Pat. No. 4,608,866 but has certain critical modifications. Referring to FIG. 2, in the event of helium leakage from the test object, nitrogen and helium gas from the probe proceeds via probe valve 38 through a stainless steel inlet tube 40 having a diameter of up to about 0.50 inch and preferably no larger than about 0.25 inch. Tube 40 terminates internallly within the cryopump chamber at outlet 42. Outlet 42 and metal gas inlet baffle 46 are directed to divert the gas to impinge on the cooled 80K inner lining 44 and to equilibrate the gas with 44 and remove at least about 50% of the gas heat before allowing the gas to pass internally to the 10K–22K surface 48. Surface 48 is fabricated entirely of lead and has multiple lead arrays or fins 47.

The metal entrance baffle 46 is in contact with and projects inwardly from the 80K surface in the vicinity of gas opening 42. This baffle contributes to the energy dissipation and cooling on the 80K surface by temporarily restricting the gas flow inward to the 10K–22K surface 48 where the nitrogen condenses and freezes. An exit baffle 50, a multi-fin component fabricated of the same material, preferably copper, as the inlet baffle 46, is positioned to restrict gas flow from the vicinity of the 18K surface 48 through flange opening exit port 52. Baffle 50, a multi-finned copper baffle, consisting of closely aligned finned copper pieces having a diameter of about 2½ inches, is situated directly above the 10K–22K shroud and below the flange opening 52 and preferably extends ½ to 1" on side of said opening. Baffle 50 is directly connected to and part of the 80° K. cooling surface and serves to obstruct and minimize radiant energy from the flange area from impinging on the 18° K. surface shroud. The flange opening determines the exit tube size and preferably is not greater than about 1.5 inches in diameter. Thus, nitrogen gas is sorbed (frozen) on the surface cooled to 10K to 22K, and preferably about 18K–20K. The cryopump may be regenerated, when exhausted, by allowing the pump to warm up to release the sorbed gases. An entrance baffle 46, preferably fabricated of copper metal, is positioned near outlet 42 and serves to enhance the equilibration and cooling at the lining 44 by restricting and redirecting the flow of gas from outlet 42.

To operate the system, the inlet valve 38 is closed, the system evacuated, and the cryopump cooled. The gas sample, comprising purified nitrogen and helium gas leaked from the test object, enters tube 40 through valve 38. Tube 40 is secured to the inner lining with a stainless steel shim 49 of about 0.001 inch thickness. The shim 49 controls flow of gas internally and prevents any passage of incoming gas through the volume 54 between the housing chamber and the 80K cooling surface.

The cryopump is used to entrap the nitrogen gas that comes from the gas emanating at the test object, either the sniffer probe or from the gas surrounding the volume of the item under test. The pressure is reduced in the cryopump by three (3) methods; namely, (a) expansion, (b) internal cooling and (3) adsorption of gas upon the inner cooled surface (10K–22K shroud). In the expansion process, five atmospheric cc. of gas is expanded into 5000 cubic centimeters giving a pressure reduction of 1000. When the gas is cooled from 300K to 80K, the pressure reduction is 3.75 so the combination of pressure, gas expansion and temperature reduction, the pressure would be $2 \times 10^{-1}$ mm of Hg.

A pressure of 10-4 mm of Hg. is necessary to operate the helium detector. This pressure reduction is further enhanced by internal baffle means to cause the nitrogen gas to equilibrate with and impinge and stick on the second cooling surface shroud of the cryopump after the nitrogen gas is first cooled to about 80° K. by equilibration with and cooling by contact with the 80° K. first cooling surface of the cryopump, said equilibration and cooling being enhanced via an entrance baffle means shielding the gas entrance port. Such equilibration markedly increases the effective sticking coefficient on the second cooling surface. Ideally, the sticking coefficient (nitrogen capture) would be 1.0 if every molecule that impinges sticks on the 15K surface. In a real world, this is only approximated. The pressure measured in the leak detector when one atmospheric cc. of gas is inserted into the cryopump is $1.5 \times 10$-5 mm of Hg. and in 2½ seconds the pressure is $3 \times 10$-8 mm of Hg. The effective sticking coefficient through the pump is 99.93% and increases to 99.9991% in 2½ seconds.

The improved pressure reduction results particularly from the baffle means consisting of an inlet baffle and a modified exit baffle. Both baffles are fabricated from copper metal. The outlet baffle 50 is positioned between the 18° K. shroud 48 and the outer port 52 to control the gas exit velocity and to equilibrate the cooled gas with the second cooling surface 48, thus enhancing the separation of nitrogen gas from the helium gas. Preferably, the outlet baffle 50. is constructed of closely aligned multiple fin shaped copper pieces having an effective cross-section of up to about 2.5 inches and a length sufficient to cover the exit port 52 and preferably extends 1.5 to 2.0 inches on either side thereof. The exit baffle additionally obstructs and minimizes radiant energy arising from the vicinity of the exit port and flange from impinging on and heating the 18° K. surface 48.

FIG. 3 presents a top view of the cryopump showing gas inlet baffle 46, the lead fins 47 in the second cooling section of the cryopump 48, the top cap 49 on the cryopump array and the heater 54 used to control the temperature on the cryopump surface 48.

Figure 4:
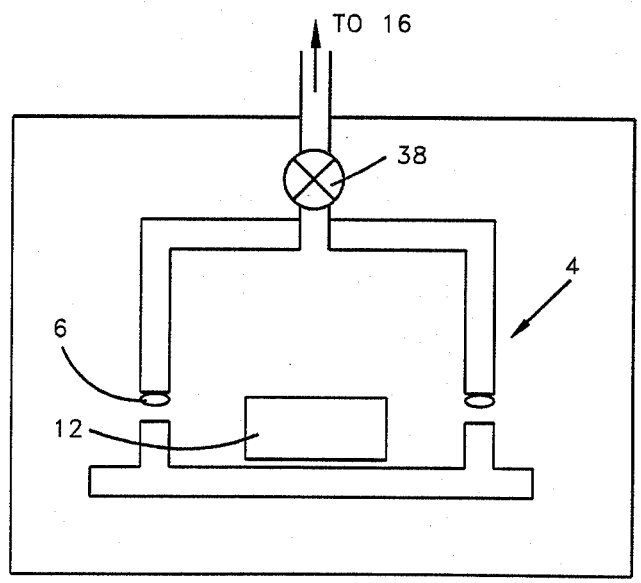
FIG. 4 is a cross-sectional view of an alternative container to the sniffer valve in FIG. 1 for receiving test objects showing relative positions of the gas sampling valve and the test object.

FIG. 4 schematically represents one aspect of the container means comprising a component test chamber 4 containing sampling valve (probe) 38, test object 12 and chamber opening seal 6 to allow a new component to be inserted and tested. The test time per component can be as short as two seconds. Chamber 4 is preferably less than 5 ccs in volume and test objects can range from a volume of 0.01 cc. to 0.40 cc.

The instant invention is advantageous over the prior art and over the Bergquist patents and other noble gas leak detectors for the following reasons:

(a) It removes the atmospheric gases, primarily nitrogen gas, and allows all of the detecting gas helium to flow into the leak detector and be measured.

(b) In the continuous mode the gas continuously is sampled and analyzed.

(c) The probe can be manipulated within the test object compartment; this allows many parts, especially small components, to be separately analyzed in a continuous fashion as opposed to a batch unit operation.

(d) In the production mode, separate small components can be tested as they move along a conveyor belt simply by change in design of the container and its internal probe. The probe can be in a cup-type container which envelops each test component as it moves rapidly along a production line; in this instance the gas sampled is static.

(e) The gas separator getter or cryopump is operated under about 1 atmosphere on the gas input side at $10^{-4}$ Torr or less at the exit port.

(f) Almost all of the nitrogen is removed and the gas passing to the detector is essentially helium gas; hence there is no need to divert only part of the gas stream for analysis or to remove helium as indicated in U.S. Pat. No. 4,593,530.

(g) The pressure reduction is 760 Torr to less than $1.0 \times 10^{-5}$ Torr (seven decades).

(h) The getter can accommodate either helium or argon as a test gas.

(i) The test object can be tested at atmospheric pressure in both static and dynamic modes.

(j) The effective nitrogen capture (sticking coefficient) on the second cooling surface is from 99.93% to 99.9991% in 2.5 seconds.

What is claimed is:

1. An apparatus for detecting gas leakage from a test object comprising:
   (a) container means for receiving or enveloping test objects containing a first gas, said container means having a second gas at approximately 1 atmosphere which surrounds the test object;
   (b) conducting means in communication with said container means for conducting a flow of said first and said second gases from said container means directly to a separator means;
   (c) said separator means arranged to receive all of said first and second gases flowing through said conducting means and configured for separating said first gas from said second gas and for entraining a sufficient quantity of said second gas to greatly increase the ratio of said first to said second gases exiting said separator means therby enabling continuous detection of said first gas by a mass detector means.
   (d) said mass detector means connected in direct unobstructed fluid communication with said separator means for detecting the first gas exiting from said separator means and providing an output signal indicative of the presence of and amount of the first gas if there is leakage of said first gas from the test object;
   (e) a pump means connected in direct fluid communication with the mass detector and which functions to exhaust the measured first gas to the atmosphere; wherein the first gas is helium, the second gas is purified nitrogen which is helium-free, said separator means is a cryogenic pump configured to separate the nitrogen gas from the helium gas by pressure reduction of said nitrogen by expansion, cooling and adsorption and to pump essentially all of the helium entering the conducting means directly to the mass detector means to detect the presence of a leak in the test object; wherein said cryogenic pump contains no helium-entrapping material and comprises a housing defining a chamber; a first cooling surface disposed interior to said housing maintained at about 80° K.; a second cooling surface maintained at about 10° K.-22° K. for adsorbing nitrogen and therby separating the nitrogen gas from the helium gas.

2. The apparatus according to claim 1 wherein the container means is a movable part that can be placed over the test object carried on a conveyor means.

3. The apparatus of claim 1 wherein said container means is a glove box.

4. The leak detector of claim 1 wherein said pump means comprises an evacuation pump.

5. The apparatus as claimed in claim 4 wherein said evacuation pump comprises a turbo pump and a mechanical pump.

6. The apparatus as claimed in claim 1 wherein said cryogenic pump has a heater, has lead on at least a portion of its interior surfaces and is free of helium entrapping material.

7. The apparatus of claim 1 wherein said first baffle means and said second baffle means are fabricated of copper.

8. The apparatus of claim 1 further comprising a shim positioned between said first cooling surface and said inlet tube for providing thermal insulation and gaseous isolation.

9. A process for detecting gas leakage from a test object comprising:
   (a) providing a container means for receiving or enveloping test objects containing a first gas, said container means having a second gas at approximately 1 atmosphere which surrounds the test object;

(b) providing conducting means for conducting a flow of gas from said container means directly to a separator means;

(c) providing a separator means for separating said first gas from said second gas in the flow of gas directly from said conducting means;

(d) providing a mass detector connected in the flow of gas directly from the separator means for detection and analysis of the first gas from the exit port of the separator;

(e) purging the container means by introducing the second gas;

(f) introducing a test object containing the first gas into the said container having the second gas at about 1 atmosphere pressure;

(g) causing the gas in the vicinity of the test object to pass via the conducting means to the separator means;

(h) entraining a sufficient quantity of the second gas in the separator means for thereby greatly increasing the ratio of said first gas to said second gas and allowing the first gas, if any, to exit the separator means and pass directly to the mass detector for detection and analysis;

(i) detecting the presence, if any, of the first gas by said mass detector; and (j) exhausting the said detected first gas from the mass detector to the atmosphere by pump means; wherein said first gas is helium, said second gas is helium-free nitrogen, said separator means comprises a cryopump having no helium entrapping material and wherein a pressure of purified nitrogen at about 1 atmosphere is maintained within the container means.

10. The process for detecting leaks as claimed in claim 9 wherein the said conducting means comprises a movable probe.

11. A process for detecting leaks as claimed in claim 9 wherein said separator means comprises a nonevaporable getter having a getter material capable of trapping nitrogen gas but passing helium, said material selected from the group consisting of zirconium/aluminum alloys, zirconium/graphite alloys and zirconium/iron alloys.

12. A process for detecting leaks as claimed in claim 9, wherein said cryogenic pump is operated at a temperature from about 10K to 22K, the pressure in said cryopump is reduced by a factor of approximately 1,000 by expansion, by a factor of approximately 4 by cooling and by a factor of approximately 6,000 by absorption of nitrogen gas on said cryopump cooled surfaces.

13. A process for detecting leaks as claimed in claim 9 wherein said cryogenic pump is operated at a temperature from about 10K to about 22K, and the pressure in the leak detector separator on expansion of about five atmosphere cc of gas into a volume of 5,000 cc. is initially about $3.0 \times 10^{-5}$ mm Hg. decreasing to $3 \times 10^{-8}$ mm Hg. in about 2.5 seconds.

14. A process for detecting leaks as claimed in claim 9 wherein said cryogenic pump has a heater to control the temperature, has lead on at least a portion of its interior surfaces and is free of helium-entrapping material.

15. The process of claim 13 where all gas entering the cryogenic pump is first directed to impinge on and equilibrate with an 80K cooling surface before being cryopumped on the 10° K.-22° K. cooling surface.

16. The process of claim 15 wherein the said cryopump has an inlet port and a metal baffle in the vicinity of the inlet port to further equilibrate and cool the gas on the 80K surface before allowing it to contact the 10° K.-22° K. surface.

17. In an apparatus for detecting helium leakage from a test object, a cryogenic pump, having no helium entrapping adsorbent, and capable of adsorbing nitrogen gas but passing helium gas comprising a housing defining a chamber; a first cooling surface disposed interior to said housing maintained at about 80° K.; a second cooling surface disposed interior to said first cooling surface maintained at about 10° K.-22° K. For absorbing and thereby separating said nitrogen from said helium gases, a gas entrance port defined by an inlet tube extending from exterior of said housing to interior of said first cooling surface and a gas exit port defined by openings in said first cooling surface and said housing for enabling a mixture of nitrogen and helium gases to enter the cryogenic pump at the entrance port and helium gas to leave via the exit port; a first baffle means disposed interior of said first cooling surface and adjacent said entrance port for directing the entering gases to impinge upon the first cooling surface before impinging upon the second cooling surface; a second baffle means located between the exit port and the second cooling surface for increasing the residence time of the nitrogen gas in the vicinity of the second cooling surface and thus enhancing separation of said nitrogen gas from said helium gas; wherein said second baffle means comprises a plurality of baffle plates arranged to overlap each other for reducing the influx of radiant energy to said second cooling surface and for increasing the residence time of said nitrogen gas in the vicinity of said second cooling surface;

and wherein the second baffle means and the outlet port are sized whereby the gaseous conductance through the second baffle means and through the outlet port are substantially the same.

18. The apparatus of claim 1 wherein said first baffle means and said second baffle means are fabricated of copper.

19. The apparatus of claim 17 further comprising a shim positioned between said first cooling surface and said inlet tube for providing thermal insulation and gaseous isolation.

20. An apparatus detecting gas leakage from a test object comprising:

(a) container means for receiving or enveloping test objects containing a first gas, said container means having a second gas at approximately 1 atmosphere which surrounds the test object;

(b) conducting means in communication with said container means for conducting a flow of said first and said second gases from said container means directly to a separator means;

(c) said separator means arranged to receive all of the first and second gases flowing through the conducting means and configured for separating the first gas from the second gas and for entraining a sufficient quantity of the second gas to greatly increase the ratio of the first to the second gas exiting said separator means thereby enabling continuous detection of the first gas by a mass detector means;

(d) said mass detector means connected in direct unobstructed fluid communication with the separator means for detecting the first gas exiting from said separator means and providing an output signal indicative of the presence of and amount of the first gas if there is leakage of the first gas from the test object;

(e) a pump means connected in direct fluid communication with the mass detector and which functions to exhaust the measured first gas to the atmosphere; wherein the first gas is helium and the second gas is purified nitrogen, said separator means is an entrainment pump configured to separate the helium gas from the nitrogen gas and to pump substantially all of the helium entering said conducting means directly to the mass detector meas to detect the presence of a leak in the test object;

said entrainment pulp is a cryogenic pump configured for reducing the pressure of said nitrogen by expansion, cooling and adsorption and having no helium entrapping substance, said cryogenic pump comprising a housing defining a chamber; a first cooling surface disposed interior to said housing maintained at about 80° K.; a second cooling surface disposed interior to said first cooling surface maintained at about 10° K.–22° K. for adsorbing and thereby separating said nitrogen from said helium gases, a gas entrance port defined by an inlet tube extending from exterior of said housing to interior of said first cooling surface and a gas exit port defined by openings in said first cooling surface and said housing for enabling a mixture of nitrogen and helium gases to enter the cryogenic pump at the entrance port and helium gas to leave via the exit port; a first baffle means disposed interior of said first cooling surface and adjacent said entrance port for directing the entering gases to impinge upon the first cooling surface before impinging upon the second cooling surface; a second baffle means located between the exit port and the second cooling surface for increasing the residence time of the nitrogen gas in the vicinity of the second cooling surface thereby enhancing separation of said nitrogen gas from said helium gas;

wherein said second baffle means comprises a plurality of baffle plates arranged to overlap each other for reducing the influx of radiant energy to said second cooling surface and for increasing the residence time of said nitrogen gas in the vicinity of said second cooling surface; and wherein the second baffle means and the outlet port are sized whereby the gaseous conductance through the second baffle means and through the outlet port are substantially the same.

21. The gas detecting apparatus of claim 20 wherein the pressure in said cryopump is reduced by a factor of approximately 1,000 by expansion, by a factor of approximately 4 by cooling and by a factor of approximately 6,000 by adsorption of nitrogen gas on said cryopump cooled surfaces.

22. The gas detecting apparatus of claim 20 wherein said cryogenic pump is operated at a temperature from about 10K to about 22K, and the pressure in the leak detector separator on expansion of about five atmosphere cc of gas into a volume of 5,000 cc. is initially about $3.0 \times 10^{-5}$ mm Hg. decreasing to $3 \times 10^{-8}$ mm Hg in about 2.5 seconds.

23. An apparatus detecting gas leakage from a test object comprising:
(a) container means for receiving or enveloping test objects containing a first gas, said container means having a second gas at approximately 1 atmosphere which surrounds the test object;
(b) conducting means in communication with said container means for conductng a flow of said first and said second gases from said container means directly to a separator means;
(c) said separator means arranged to receive all of said first and second gases flowing through said conducting means and configured for separating said first gas from said second gas and for entraining a sufficient quantity of said second gas to greatly increase the ratio of said first to said second gases exiting said separator means thereby enabling continuous detection of said first gas by a mass detector means;
(d) said mass detector means connected in direct unobstructed fluid communication with said separator means for detecting the first gas exiting from said separator means and providing an output signal indicative of the presence of and amount of the first gas if there is leakage of said first gas from the test object;
(e) a pump means connected in direct fluid communication with the mass detector and which functions to exhaust the measured first gas to the atmosphere; wherein the first gas is helium and the second gas is purified nitrogen said separator means is an entrainment pump configured to separate the helium gas from the nitrogen gas and to pump substantially all of the helium entering said conducting means directly to the mass detector means to detect the presence of a leak in the test object;
wherein the separator is a nonevaporable getter comprising multiple barriers with absorbing surfaces comprising a getter material selected from the group consisting of zirconium/aluminum alloys, zirconium/graphite alloys and zirconium/iron alloys.

* * * * *